United States Patent [19]
Barenboim et al.

[11] Patent Number: 6,103,990
[45] Date of Patent: Aug. 15, 2000

[54] LASER TEXTURING SYSTEM PROVIDING EVEN HEATING OF TEXTURED SPOTS ON A ROTATING DISK

[75] Inventors: Michael Barenboim; Pieter J. M. Kerstens, both of Boca Raton; Hee Kuwon Park, Boynton Beach; Leonard S. Sheiner, Margate, all of Fla.; Andrew Ching Tam, Saratoga, Calif.

[73] Assignee: International Business Machines Corporation, Armonk, N.Y.

[21] Appl. No.: 09/157,764

[22] Filed: Sep. 21, 1998

[51] Int. Cl.[7] ................................. B23K 26/08
[52] U.S. Cl. .................. 219/121.68; 219/121.73; 219/121.79
[58] Field of Search ............... 219/121.6, 121.68, 219/121.73, 121.75, 121.78, 121.79, 121.8, 121.82; 264/400; 427/555

[56] References Cited

U.S. PATENT DOCUMENTS

| | | | |
|---|---|---|---|
| 4,645,900 | 2/1987 | Heyden | 219/121.67 |
| 5,021,631 | 6/1991 | Ravellat | 219/121.68 |
| 5,279,775 | 1/1994 | Thomas et al. | 219/121.61 X |
| 5,416,298 | 5/1995 | Robert | 219/121.68 |
| 5,528,922 | 6/1996 | Baumgart et al. | 73/1 J |
| 5,586,040 | 12/1996 | Baumgart et al. | 364/474.08 |
| 5,595,768 | 1/1997 | Treves et al. | 425/174.4 |
| 5,595,791 | 1/1997 | Baumgart et al. | 427/554 |
| 5,645,740 | 7/1997 | Naiman et al. | 219/121.68 |
| 5,658,475 | 8/1997 | Barenboim et al. | 219/121.77 |
| 5,822,211 | 10/1998 | Barenboim et al. | 219/121.82 X |
| 5,861,196 | 1/1999 | Kuo et al. | 427/555 |
| 5,910,262 | 6/1999 | Baumgart et al. | 219/121.68 X |

FOREIGN PATENT DOCUMENTS

| | | |
|---|---|---|
| 0652554A1 | 5/1995 | European Pat. Off. . |
| 61-134724 | 6/1986 | Japan . |
| 93/25387 | 12/1993 | WIPO . |

OTHER PUBLICATIONS

J. Lekavich, "Basics of Acousto–Optic Devices," *Lasers & Applications*, Apr., 1996, pp. 59–64.

*Primary Examiner*—Gregory Mills
*Attorney, Agent, or Firm*—Richard A. Tomlin; Ronald V. Davidge

[57] ABSTRACT

Laser texturing apparatus includes an acousto-optical modulator which deflects a continuous laser beam into a first optical projection path to texture a first side of a disk or into a second optical projection path to texture a second side of the disk. The modulator causes lateral movement of the laser beam in a first direction as it is initially deflected into the first optical projection path and at the end of its deflection into this path. The modulator also caused lateral movement of the laser beam in a second direction as it is initially deflected into the second optical path and at the end of its deflection into this path. Each optical projection path is configured so that this lateral movement is in the direction of movement of the disk being textured at the spots at which it is textured.

8 Claims, 5 Drawing Sheets

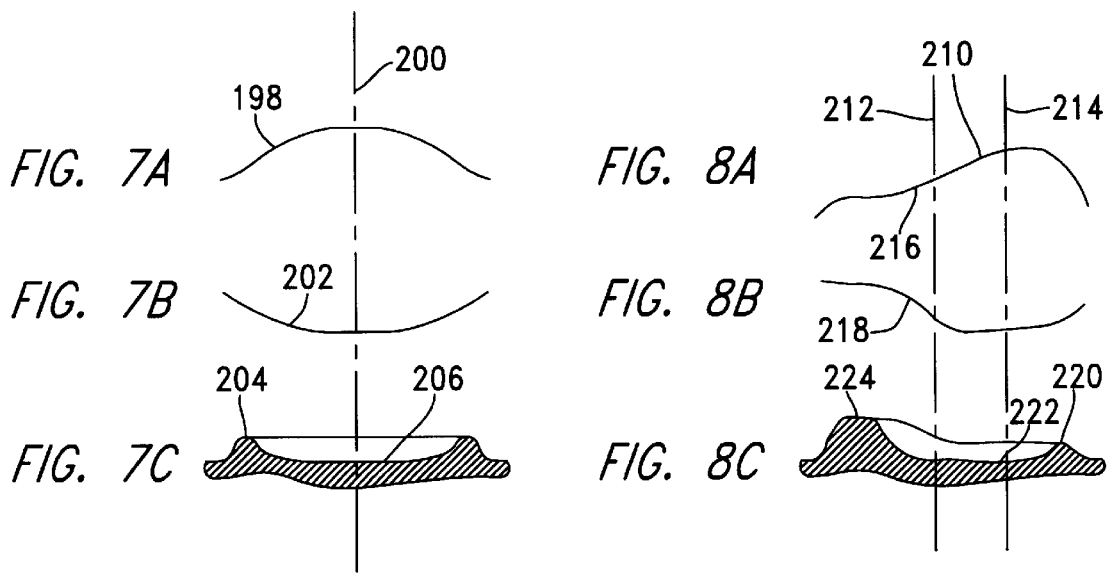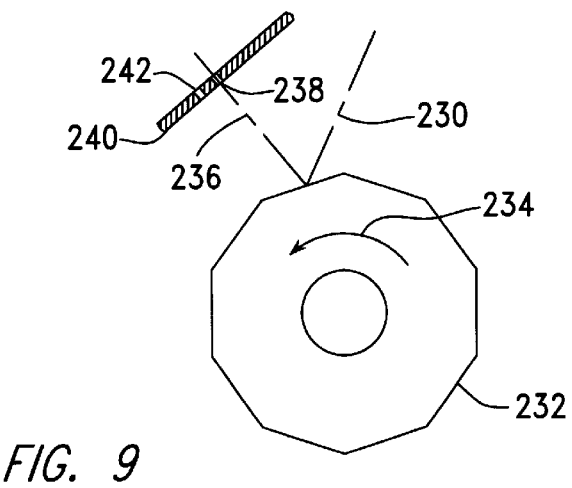
FIG. 9

LASER TEXTURING SYSTEM PROVIDING EVEN HEATING OF TEXTURED SPOTS ON A ROTATING DISK

CROSS REFERENCE TO RELATED APPLICATIONS

This application is related to a application Ser. No. 08/707,363, entitled "Optical Apparatus for Dual-Beam Laser Texturing," and having a common assignee, the disclosure of which is incorporated herein by reference. This application is also related to a application Ser. No. 08/825, 305, now U.S. Pat. No. 5,963,569, filed Mar. 28, 1997, entitled "Multiple Channel Acousto-Optic Modulators," and having a common assignee, the disclosure of which is incorporated herein by reference. This application is further related to a application Ser. No. 08/825,307, now U.S. Pat. No. 5,981,903 filed Mar. 28, 1997, entitled "Laser System for Simultaneous Texturing of Two Sides of a Disk," and having a common assignee., the disclosure of which is incorporated herein by reference.

FIELD OF THE INVENTION

This invention relates to the field of apparatus for the production of hard drive disk s for computer systems, and, more particularly, to the field of texturing annular portions of such disks to provide a surface from which the magnetic head of a disk drive can be raised, or to which the magnetic head can be lowered, while physical contact between the magnetic head and the disk surface is minimized.

BACKGROUND INFORMATION

Current hard drives use a Contact Start-Stop (CSS) system allowing a magnetic head, used to read and write data, to contact the surface of a magnetic disk in a specific CSS region when the disk is stationary. Thus, before the rotation of the spinning disk has stopped, the magnetic head is moved to the CSS region, where the magnetic head strikes on the surface of the disk. When the disk again starts to rotate, the magnetic head slides along the disk surface in this region, until the laminar airflow at the disk surface, caused by its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region, the remainder of the disk surface preferably retains a specular smoothness by avoiding physical contact with the magnetic head, permitting the reading and recording of high-density magnetic data.

U.S. Pat. No. 5,658,475 describes a laser tool for texturing disks to be used in hard disk drives in computer systems. The process leaves an annular textured portion of both sides of each disk. Disks are moved into and out of the texturing process in cassettes, through two disk-handling stations. In each disk-handling station, a lifter raises each individual disk from the cassette in which it is carried. The individual disk is then transferred to a pick-and-place mechanism, which moves it to a spindle. The spindle spins and translates the disk, so that both sides of the disk are exposed to beams derived from a pulsed laser. The pick-and-place mechanism then returns the disk to the lifter, which lowers it into the cassette pocket from which it was taken. The-pick-and place mechanism simultaneously moves one disk from the lifter to the spindle and another from the spindle to the lifter. While disks are moved by the pick-and-place mechanism of one disk handling station, a disk in the spindle of the other disk handling station is exposed to the laser beams.

The texturing process uses, for example, a tightly-focused, Q-switched, diode-pumped Nd:YLF solid state laser, providing an output at an infrared wavelength of 1047 nanometers, or an ND:YVO$_4$ solid state laser. The beam from the laser is broken into two sub-beams within a beamsplitter, with one of the sub-beams being directed to a first side of the disk being textured, and with the other sub-beam being directed to the second (other) side of the disk being textured. With this system, each pulse of the texturing laser, traveling as the two sub-beams, produces a single textured spot on each side of the disk being textured. Depending on the adjustment of various parameters, each textured spot may be a depression, a depression with a surrounding raised ridge, or a bump surrounded by a trough, which is in turn surrounded by a raised ridge.

Recent developments in the design of hard disk drives lead to a reduction in size of the magnetic head used for reading and writing data, and hence to a need for smaller patterns of textured spots placed more closely to one another. To make smaller textured spots, the size of the laser spot directed at the disk must be reduced. In an optical system for laser texturing, the laser beam is focused onto the disk through a lens having an aperture which controls the laser spot size. The laser spot size is directly proportional to the wavelength of the laser beam and inversely proportional to the diameter of the focusing lens aperture. On the other hand, simply reducing the aperture diameter may reduce the depth of focus to the optical system to a point at which it becomes difficult to produce consistently-shaped textured spots. The depth of focus of the system is directly proportional to the wavelength and inversely proportional to the square of the aperture diameter. Thus, if the wavelength is reduced by 50 percent, the aperture size must be increased by about 40 percent to maintain the same depth of field. However, even with this increase in aperture size, the spot size is still reduced to about 70 percent of the spot size produced with the longer wavelength. Thus, what is needed is a system using a texturing laser having a wavelength of about half that of the infrared laser (1047 nanometers). Such a system may use, for example, a green laser having a wavelength of 532 nanometers.

Since these spots must be placed more closely together in a circumferential direction, the texturing laser beam must be pulsed more rapidly, assuming that the rotational speed of the disk being textured is not changed. Since these spots must be placed more closely together in a radial direction, more revolutions of the disk must occur while the annular portion of the disk is textured. In order to maintain a satisfactory level of throughput in a production environment, the rotational speed of the disk must be increased, again causing an increase in the rate at which the texturing laser beam is pulsed.

The pulsed laser technology U.S. Pat. No. 5,658,475 is limited to operation at about 100,000 pulses per second. Operation at higher speeds does not allow time for sufficient energy to build up within the laser cavity before a pulse is to be emitted. What is needed is apparatus operable at a much higher rate to provide smaller textured spots in an efficient manner.

As the rate at which the texturing laser beam is pulsed is increased, the times required to turn this beam on and off can become significant portions of the time during which texturing occurs, depending on the type of beam modulation used. That is, the texturing laser beam is only partly turned on during significant portions of the process used to form a single textured spot. This time-varying laser geometry can result in an unevenly formed textured spot. Furthermore, as the rotational speed of the disk being textured is increased, the surface of the disk moves through an increased distance during the exposure of a spot to a laser pulse. This effect can also result in an unevenly formed textured spot. Thus, what is needed is a method for forming an evenly shaped textured spot by exposing the moving disk surface to a time-varying laser geometry.

SUMMARY OF THE INVENTION

According to a first aspect of the present invention there is provided apparatus for forming textured spots in a surface moving in a first direction. The apparatus includes a laser producing a continuous laser beam, a modulator deflecting the laser beam into a deflected beam path, and optical projection means extending between the modulator and a stationary point at the surface to be textured. The continuous laser beam is deflected by the modulator into the deflected beam path with lateral movement in a second direction, and is deflected out of the deflected beam path with lateral movement also in the second direction. The optical projection means projects the laser beam on the surface to be textured with the lateral movement in the second direction being projected as lateral movement in the first direction.

BRIEF DESCRIPTION OF THE DRAWINGS

FIG. 3A shows the modulator in an absence of deflection of a continues laser beam. FIGS. 3B–3D show the modulator in various stages of deflection of the laser beam in a first direction. FIGS. 3E–3G show the modulator in various stages of deflection of deflection of the laser beam in a second direction.

Each

FIGS. 7A–7C show the formation of a textured spot on a disk moving at a slow speed or of a disk moving rapidly in the apparatus of FIG. 1.

FIGS. 8A–8C show the formation of a textured spot on a disk moving at rapidly in apparatus not built in accordance with the present invention.

FIGS. 7A and 8A are graphical views of a temperature pattern reached at the end of a texturing pulse.

FIGS. 7B and 8B are graphical views of a pattern of surface tension occurring in response to the temperature patterns of the corresponding FIGS. 7A and 8A.

FIGS. 7C and 8C are cross-sectional views of textured spots formed in response to the surface tension patterns of the corresponding FIGS. 7B and 8B.

FIG. 9 shows at alternate embodiment of a modulator.

DETAILED DESCRIPTION

Figure 1:
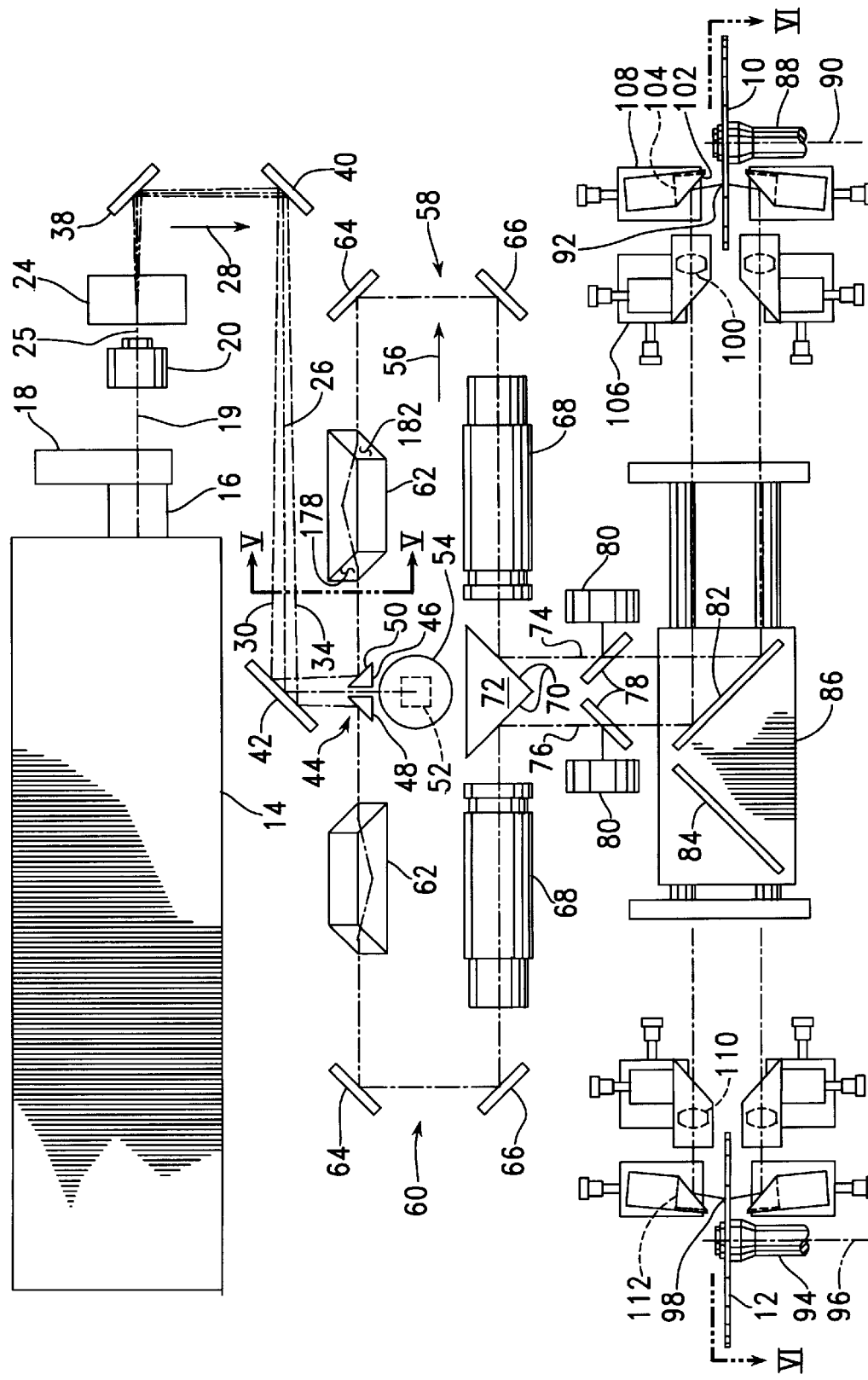
FIG. 1 is a plan view of disk texturing apparatus built in accordance with the present invention.

FIG. 1 is a plan view of optical apparatus for a laser texturing station built in accordance with the present invention. The beam used for texturing a first disk 10 and a second disk 12 is derived from the output of a continuous laser 14, which is, for example, a green laser producing a beam having a wavelength of 532 nanometers. The output beam from the laser 14 is directed through an electronic process shutter 16 and a mechanical safety shutter 18. When the laser texturing station is operating, with disks being moved through the station, the actual texturing process for each disk is started by opening the electronic process shutter 16, and is stopped by closing this shutter 16. The safety shutter 18 remains open during the entire texturing process, unless an error condition, such as a jam preventing prescribed movement of disks though the process, occurs. Such an error condition causes the safety shutter 18 to close, forming a light-tight assembly with the laser 14 and electronic process shutter 16, from which laser energy cannot escape.

The continuous laser beam 19 leaving the safety shutter 18 is directed into beam shaping optics 20, which reduces the diameter of the laser beam as required for proper operation of an adjacent AOM 24 (acousto-optic modulator). An incident laser beam 25 is directed to the AOM 24, which causes the laser beam either to be transmitted straight through, along a central beam path 26, so that the disk 10 is not textured, to be deflected in the direction of arrow 28 along a first deflected beam path 30, so that a first side 32 of the disk 10 is textured, or to be deflected opposite the direction of arrow 28 along a second deflected beam path 34, so that a second side 36 of the disk 10 is textured. Within the AOM 24, a laser beam directed along either of the deflected beam paths 30, 34 is deflected through an angle of about one half degree from the central beam path 26. The first three steering mirrors 38, 40, 42 are sufficiently wide to steer the output beam from the AOM 24, whether it is following the central beam path 26 or either of the deflected beam paths 30, 34.

From steering mirror 42, the laser beam is directed to a beam separator 44, consisting of a pair of spaced-apart prisms 46, 48, each of which has a front surface 50 reflectively coated to reflect the laser beam. If the laser beam is following the central beam path 26, it passes between the spaced-apart prisms 46, 48, to be deflected upward by an obliquely extending reflective surface 52 into a first photodetector 54, which is used to correct for changes in the output of the laser 14. If the laser beam is following the first deflected beam path 30, it strikes the reflective surface 50 of the first prism 46, being deflected thereby in the direction of arrow 56 to travel through a first beam shaping path 58. On the other hand, if the laser beam is following the second deflected beam path 34 it strikes the reflective beam surface of the second prism 48, being deflected thereby opposite the direction of arrow 56 to travel through a second beam shaping path 60. The prisms 46, 48 are preferably oriented so that the deflected beam paths 30, 34 enter the beam shaping paths 58, 60 in alignment with one another, but in opposite directions from one another.

Figure 5:
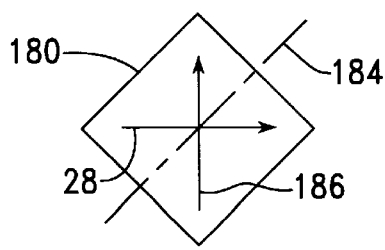
FIG. 5 is a cross-sectional view of the apparatus of FIG. 1, taken as indicated by section lines V—V in FIG. 1 to show a dove prism therein.

Each beam shaping path 58, 60 includes a dove prism 62, which rotates the laser beam about its path through a 90-degree angle in a manner to be discussed in reference to FIG. 5, a pair of steering mirrors 64, 66, and a beam expander 68, which increases the diameter of a laser beam entering from the adjacent steering mirror 66 while maintaining collimation.

The expanded laser beam leaving either beam expander 68 strikes an associated reflective surface 70 of a beam directing prism 72. From the beam directing prism 72, a first expanded beam path 74 and a second expanded beam path 76 extend in a parallel, spaced-apart relationship. Each of these beam paths 74, 76, extends through a non-polarizing beamsplitter 78, which reflects four percent of the laser beam energy into an associated photodetector 80. These photodetectors 80 are used to monitor the performance of the AOM 24, monitoring the difference, if any, between the power level of the laser beam as it is directed along the first expanded beam path 74 and as it is directed along the second expanded beam path 76. These power levels are controlled to be very close to one another, so that the disks 10, 12 are textured in the same manner on each side.

The remaining laser energy transmitted through the beamsplitters 78 is reflected by a shuttle mirror 82, 84 toward a disk 10, 12, being textured. The shuttle mirrors 82, 84 are mounted on a sliding block 86. The sliding block 86 is moved in the direction of arrow 56, from the position in which it is shown, in which a laser beam traveling along either of the expanded beam paths 74, 76 is reflected by shuttle mirror 82 toward the disk 10 for texturing, into a position in which a laser beam traveling along either of the expanded beam paths 74, 76 is reflected by shuttle mirror 84 toward the disk 12 for texturing.

The disks 10, 12 are alternately placed within the disk texturing apparatus by means of disk-handling stations which are described in detail in U.S. Pat. No. 5,658,475. One of the disk-handling stations places a disk 10 on a spindle 88, which is rotated about its axis 90 and translated opposite the direction of arrow 56 so that a spiral pattern of textured spots is placed on each side of the disk at a texturing point 92. The other disk-handling station places a disk 12 on a spindle 94, which is rotated about its axis 96 and translated in the direction of arrow 56 so that a spiral pattern of textured spots is placed on each side of the disk at a texturing point 98. The disks 12 are moved on and off the spindle 94 as a disk 10 is being textured on the spindle 88. Similarly, the disks 10 are moved on and off the spindle 88 as a disk 12 is being textured on the spindle 94.

A focusing lens 100 on each side of the disk 10 held within the spindle 94 is used to focus laser beam energy on the associated texturing point 92. A reflective surface 102 on a prism 104 directs the focused beam at the texturing point 92. The focusing lens 100 is mounted in an adjustable stage 102, allowing movement of the lens 100 in and opposite the direction of arrow 56 for focusing, and allowing movement of the lens 100 perpendicular to the direction of arrow 56 for alignment of the optical path. The prism 104 is mounted on an adjustable stage 108, being pivotally adjusted to minimize the level of energy reflected back through the lens 100 from the surface of the disk 10 being textured, and being translated to determine the location of texturing point 92. A similarly-mounted focusing lens 110 and prism 112 adjacent each side of the disk 12 held on spindle 94 is used to focus the laser beams and to establish the texturing points 98 on this disk 12.

A significant difference between the laser texturing station of the present invention and that of U.S. Pat. No. 5,658,475 arises from the fact that, in the laser texturing station of the present invention, a texturing laser beam pulse from AOM 24 is alternately directed along either of the deflected beam paths 30, 34, while, in the laser texturing station of U.S. Pat. No. 5,658,475, the texturing laser beam pulse is divided between two sub-beam paths within a beamsplitter. Thus, in accordance with the present invention, the full power of each pulse (except for various losses) is used for forming a single textured spot. On the other hand, in the texturing station of U.S. Pat. No. 5,658,475, the power each laser pulse is divided between two spots being textured on opposite sides of a disk. Furthermore, while the pulsed laser technology of U.S. Pat. No. 5,658,475 is limited to operation at about 100,000 pulses per second, the modulated laser technology of the present invention can be operated at pulse rates as high as 3 million pulses per second, with a pulse rate of 1 million pulses per second appearing to be sufficient for efficient operation of the texturing process.

Figure 2:
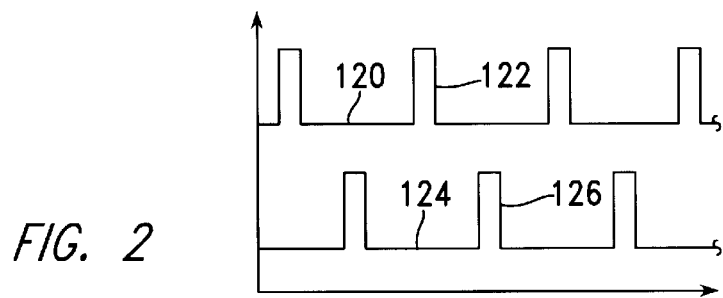
FIG. 2 is a graphical view of control signals used to operate an acousto-optical modulator in the apparatus of FIG. 1.

FIG. 2 is a schematic view of the control signals used to drive acoustical transducers within the AOM 24 so that texturing pulses from the laser beam are alternately driven along the first deflected beam path 30 and the second deflected beam path 34 (all shown in FIG. 1A). A first control signal 120 includes a number of periodically spaced pulses 122, each of which causes the laser beam to be deflected to the first deflected beam path 30, while a second control signal 124 includes a number of periodically spaced pulses 126, each of which causes the laser beam to be deflected to the second deflected beam path 34. Whenever pulses 122 and 126 are both absent, the laser beam is transmitted along the central beam path 26.

FIGS. 3A–3G are partly schematic plan views of the structure within AOM 24, illustrating operation of this device to deflect an incoming laser beam. The angles at which beam deflection occurs are exaggerated within these FIGS. for clarity. The AOM 24 includes a crystal 130, which may, for example, be composed of quartz, having an incident face 132 at which the incident laser beam 25 is directed and a pair of transducer mounting faces 134, 136, each of which is cut at a specific angle relative to the optical axis 138, along which the incident laser beam 25 is directed. The AOM 24 also includes a pair of acoustic transducers 140, 142. Each pulse 122 from the first control signal 120 (shown in FIG. 2) causes the first acoustic transducer 140 to be driven by a signal generated within an RF signal generator (not shown). Similarly, each pulse 126 from the second control signal 124 (also shown in FIG. 2) causes the second acoustic transducer 142 to be driven by the RF signal generator. An exemplary version of an AOM is described in detail in the copending related application Ser. No. 08/825,305, which has been incorporated herein by reference.

Figures 3A, 4A:
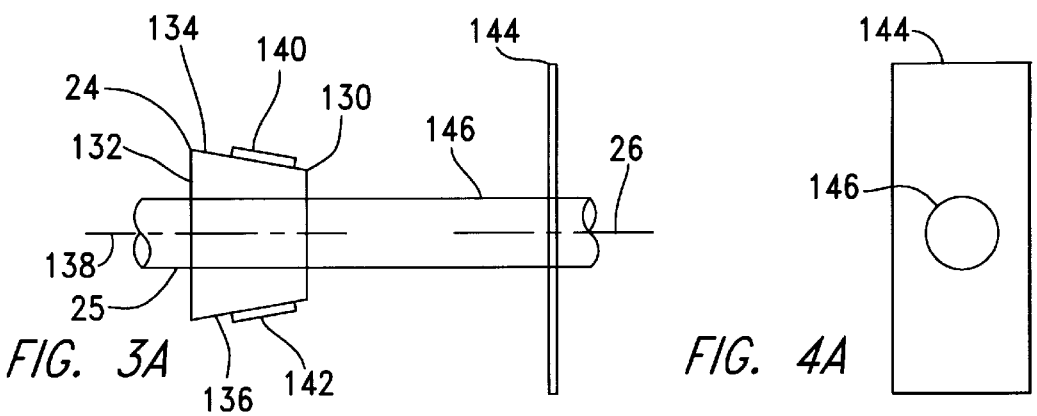
FIGS. 3A–3G are partly schematic views of an acousto-optical modulator in the apparatus of FIG. 1.
FIGS. 4A—4G is a elevational view showing the shape of one or two laser beams leaving the acousto-optical modulator under the conditions of a corresponding FIGS. 3A–3G.
Figures 3B, 4B:
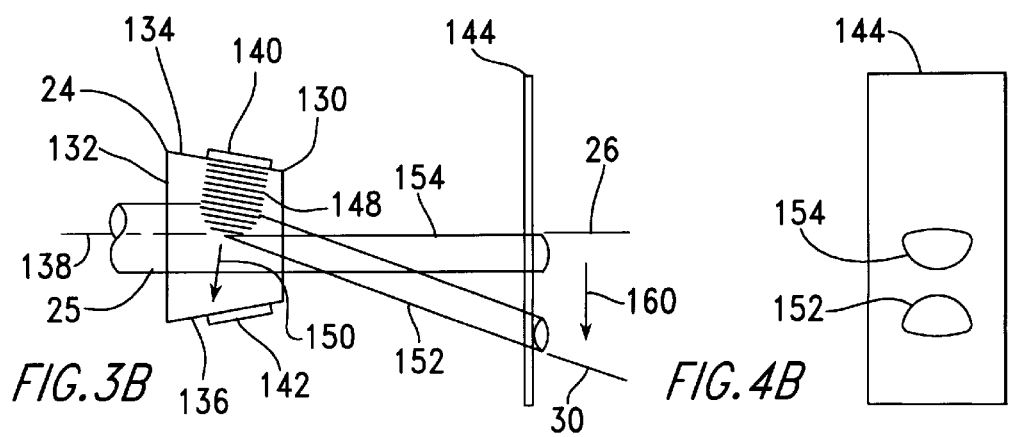

FIGS. 4A–4G are elevational views of the output beam(s) from the AOM 24, as produced by the operational conditions of corresponding FIGS. 3A–3G, with FIG. 3A corresponding to FIG. 4A, FIG. 3B corresponding to FIG. 4B, etc. The shape of each output beam is shown as it would be made visible on a ground glass screen 144, which has been added herein for purposes of illustration.

FIGS. 3A and 4A show conditions occurring in the an absence of the control signal pulses 122, 126 (shown in FIG. 2). With neither transducer 140, 142 being driven, the incident beam 25 is transmitted straight through the crystal 130 to form a round beam 146 extending along central beam path 26.

FIGS. 3B AND 4B show conditions occurring at the beginning of a control signal pulse 122. The first transducer 140 is driven with an RF signal, creating an acoustic field 148 preceding through the crystal 130 in the direction of arrow 150 at the speed of sound within the crystal 130. As this acoustic field 148 crosses the central portion of the crystal 130, through which the incident laser beam 25 is being transmitted, an increasing portion of this incident beam 25 is diffracted as an irregularly-shaped beam 152 to follow the first deflected beam path 30. The remaining portion of the incident beam 25, having not yet been influenced by the acoustic field 148, is transmitted without diffraction to form an irregularly-shaped beam 154 following the central beam path 26. In the example of FIGS. 3B and 4B, with the acoustic field 148 extending about halfway into the incident beam 25, the shape of beams 152, 154 is determined by the fact that the circular incident beam 25 is bisected to form the beams 152, 154.

Figures 3C, 4C:
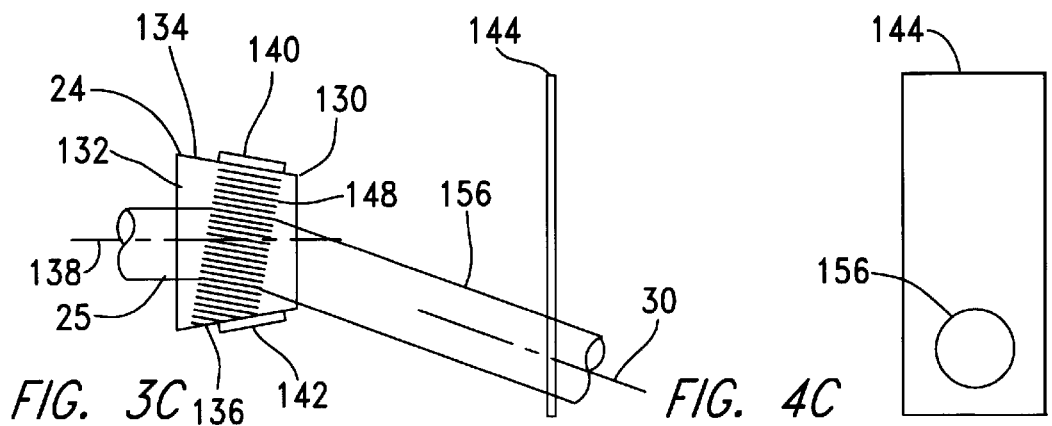

FIGS. 3C and 4C show conditions occurring during a central part of a pulse 122 (shown in FIG. 2), with the first acoustic transducer 140 continuing to generate the acoustic field 148, which extends fully across the incident beam 25, Under these conditions, the incident beam 25 is diffracted to form a round beam 156 following the first deflected beam path 30.

Figures 3D, 4D:
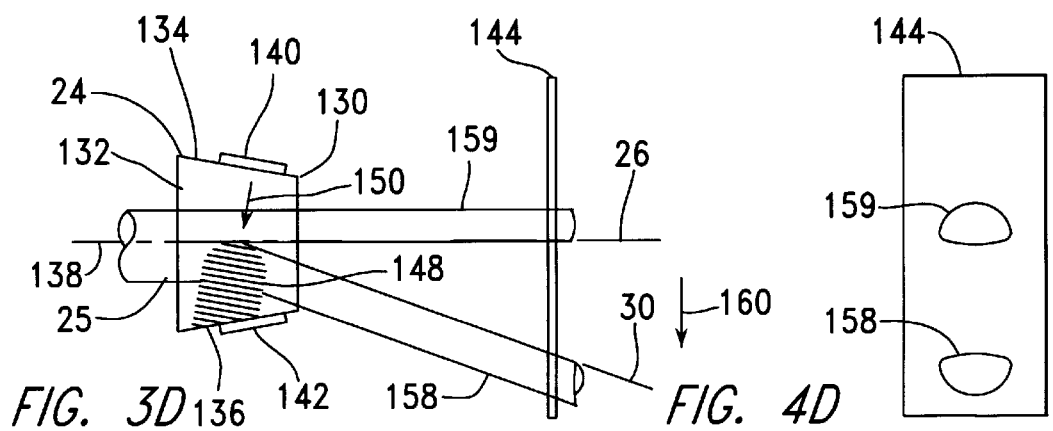

FIGS. 3D and 4D show conditions occurring immediately following a pulse 122. At this point, the signal driving the first acoustic transducer has been terminated, so the acoustic field 148 is no longer being generated. However, a remaining portion of the acoustic field 148, continuing to travel in the direction of arrow 150 at the speed of sound within the crystal 130, still causes a decreasing portion of the incident beam 25 to be diffracted to form an irregularly-shaped beam 158 extending along the first deflected beam path 30. The remaining portion of the incident beam 25 forms an irregularly-shaped beam 159 extending along the central beam path 26.

Thus, with each pulse 122 (shown in FIG. 2) a texturing laser beam is directed along the first deflected beam path 30, beginning to fill a circular space in which the laser beam is directed along this path 30 from the side of this space closest to the central beam path 26, preceding to fill this circular space by movement in a direction of arrow 160, away from the central beam path 26, and eventually moving onward in the direction of arrow 160 to disappear. At the fast cycling rates, in terms of pulses per second, required to achieve production economies, the times required to move the beginning and end of the acoustic field 148 across incident beam 25 at the speed of sound within the crystal material become significant portions of the time used to produce a textured spot. This phenomenon causes an effect having much in common with moving a laser beam in the direction of arrow 160 during the texturing process.

The operation of the AOM 24 in response to a pulse 126 (shown in FIG. 2) will now be discussed, with reference being made to FIGS. 3E through 3G and 4E to 4G.

Figures 3E, 4E:
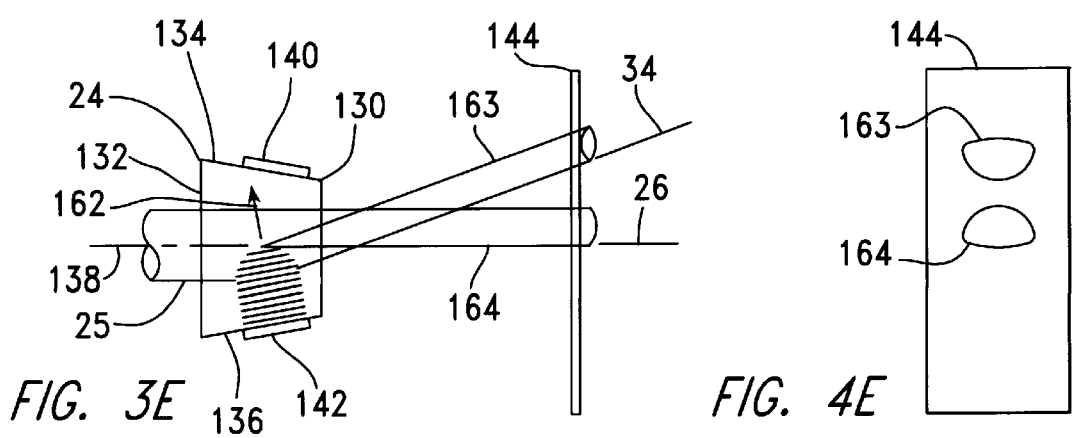

FIGS. 3E and 4E show conditions occurring immediately after the beginning of such a pulse 126, which causes the second acoustical transducer 142 to be driven by the RF frequency generator (not shown). In the example of FIG. 3E, the acoustic field 161 generated by the second acoustical transducer 142 has moved about half of the distance across the incident laser beam 25 in the direction of arrow 162, causing a first portion of the incident beam to be diffracted as an irregularly shaped beam 163 along the second deflected beam path 34, while the remaining portion of the incident beam 25 continues along the central beam path 26 as an irregularly shaped beam 164.

Figure 3F:
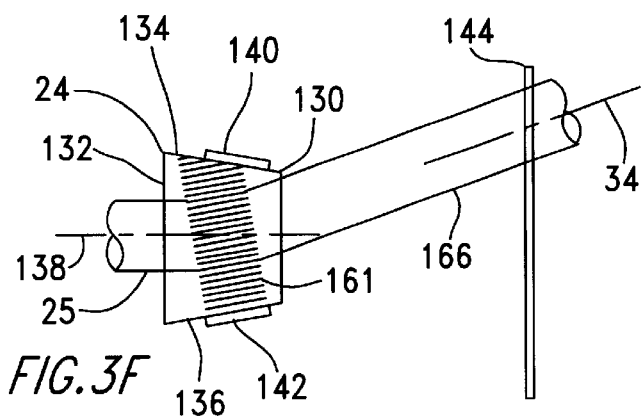
Figure 4F:
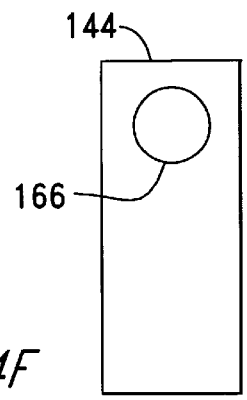

FIGS. 3F and 4F show conditions occurring during a central portion of the pulse 126, with the acoustic field 161 extending entirely across the incident beam 25, so that all of this beam 25 is diffracted to form a round beam 166 extending along the second deflected beam path 34.

Figure 3G:
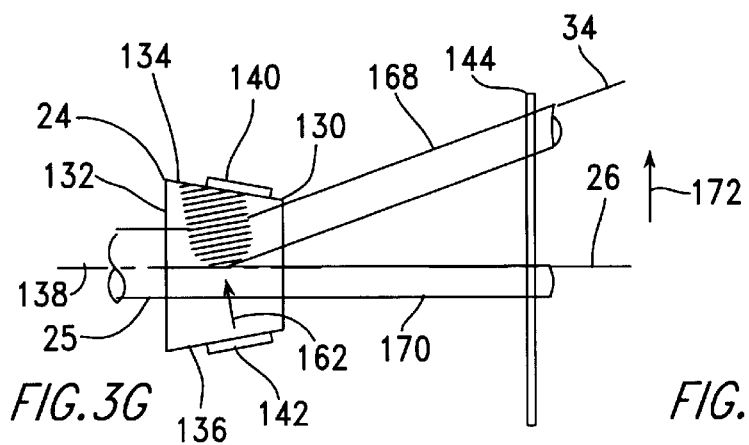
Figure 4G:
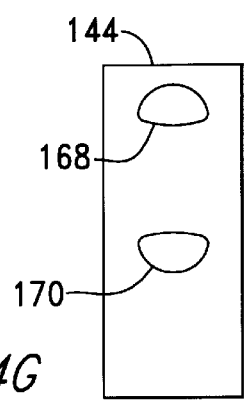

FIGS. 3G and 4G show conditions occurring immediately after the end of the pulse 126, with the acoustic field 161 moving away in the direction of arrow 162, as an ever diminishing portion of the incident beam 25 is diffracted to travel along the second deflected beam light path as an irregularly-shaped beam 168, and as an ever increasing portion of the incident beam 25 is transmitted along the central beam path 26 as an irregularly-shaped beam 170.

Thus, with each pulse 126 (shown in FIG. 2) a texturing laser beam is directed along the second deflected beam path 34, beginning to fill a circular space in which the laser beam is directed along this path 34 from the side of this space closest to the central beam path 26, preceding to fill this circular space by movement in a direction of arrow 172, away from the central beam path 26, and eventually moving onward in the direction of arrow 172 to disappear. This phenomenon causes an effect having much in common with moving a laser beam in the direction of arrow 172 during the texturing process.

Referring again to FIGS. 1 and 2, between the AOM 24 and the prisms 46, 48 separating the deflected beam paths 30, 34, the texturing beams move away from one another after the beginning and end of the pulses 122, 126. After reflection off the reflective surfaces 50 of the prisms 46, 48, both the texturing beams move laterally in the direction of arrow 28 after the beginning and end of pulses 122, 126.

FIG. 5 is an end view of the dove prism 62 in the first beam shaping path 58. Referring to FIGS. 1 and 5, the laser beam entering the dove prism 62 is refracted at a first end 178, reflected internally from an elongated side 180, and refracted again at a second end 182 to continue in a direction parallel and in alignment with the direction at which the beam proceeds to the dove prism 62. The reflection occurring within the dove prism 62 causes the image entering the dove prism to be inverted about an axis 184 parallel to the elongated side 180. This inversion of the image causes the lateral beam motion indicated by arrow 28 to become an upward lateral motion, in the direction of arrow 186, upon exit from the dove prism. A similar process occurs within the dove prism 62 in the second beam shaping path 60, with the lateral motion in the direction of arrow 28 being converted to lateral motion in the upward direction of direction if arrow 186.

Each texturing beam continues, with reflections off steering mirrors 64 and 66, off either reflecting surface 70 of the prism 72, and off reflector 82 or 84, with the lateral beam movement remaining directed upward, in the direction of arrow 186. However, at each focusing lens 100 or 110, the lateral beam movement is inverted to be directed downward, opposite the direction of arrow 186.

Figure 6:
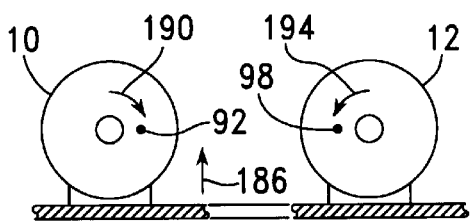
FIG. 6 is a cross-sectional view of the apparatus of FIG. 1, taken as indicated by section lines VI—VI in FIG. 1 to show the rotations of disks being textured therein.

FIG. 6 is a fragmentary cross sectional elevation of the optical apparatus of FIG. 1, taken as indicated by section lines VI—VI in FIG. 1 to show the directions in which the disks 10, 12 are driven during the texturing process. Disk 10 is driven in the direction of arrow 190, and disk 12 is driven in the direction of arrow 192. Thus, the surfaces of disk 10 are moving downward due to disk rotation at the point 92 on each side of the disk 10, where texturing occurs. Also, the surfaces of disk 12 are moving downward due to disk rotation at the point 98 on each side of the disk 12, where texturing occurs.

Therefore, the movement of the disk at the texturing points 92, 98 is in the same direction as the lateral movement of the texturing laser beam, due to the phenomenon described above in reference to FIGS. 3A–3G and 4A–4G. The dove prisms 62 are used to rotate the image of the effect caused by this phenomenon so that the direction of lateral movement is the same as that of each disk at its texturing points.

The significance of configuring a system used to project the laser beam output from AOM 24 so that the lateral movement of the texturing laser beam is in the same direction will now be explained with reference being made to FIGS. 7A–7C and 8A–8C. FIGS. 7A–7C represent the formation of a textured spot without relative movement between the path of the laser beam and the spot being textured on the disk surface. FIGS. 8A–8C represent the formation of a textured spot with significant relative movement between the path of the laser beam and the spot being textured on the disk surface, with such movement occurring, for example, due to the rotation of the disk being textured while rotating at a high speed.

FIG. 7A represents, with a curve 198, the temperature achieved during the last part of the texturing process, as a function of distance from a center line 200 of the texturing laser beam. The temperature is higher near the center of the spot being exposed to the laser beam, primarily due to radial variations in the energy of the laser beam. This temperature distribution is approximated by the process of forming relatively large textured spots on the surfaces of a disk turning at a relatively slow speed.

FIG. 7B represents, with a curve 202, the surface tension corresponding to the temperature function of FIG. 7A. As the temperature increases, the surface tension lowers.

FIG. 7C is a transverse cross sectional view of a textured spot formed by the process represented in FIGS. 7A and 7B. After the material is locally melted, it flows from areas of low surface tension to areas of relatively high surface tension. Such areas of high surface tension are found in an annular portion 204, which has received less heating than the central portion 206, but which has received enough heating to melt the material. Since the temperature distribution of FIG. 7A varies only radially, with distance from the center line 200, the ridge 204 is uniform, forming a type of surface which is considered to be ideal for the CSS portion of a magnetic disk.

FIG. 8A represents, with a curve 210, the temperature achieved during the last part of the process of texturing a spot in which the texturing process started with the center line of the texturing laser beam at center line 212 and completed with the center line of the texturing laser beam at center line 214. This movement of the center line of the texturing laser results, for example, from rotational movement of the disk as the individual textured spot is exposed to the laser. This temperature profile results from cooling which occurs in the part of the material first heated, as the center line of the texturing laser moves toward the center line 214. This effect causes the lowered temperature portion 216 of the curve 216. This temperature profile occurs, for example, when relatively small textured spots are formed during the rotation of a disk at relatively high speeds.

FIG. 8B represents, with a curve 218, the surface tension corresponding to the temperature function of FIG. 8A. Again, as the temperature increases, the surface tension lowers.

FIG. 8C is a transverse cross sectional view of a textured spot formed by the process represented in FIGS. 8A and 8B. After the material is locally melted, it flows from areas of low surface tension to areas of relatively high surface tension. Such areas of high surface tension are found in an annular portion 220, which has received less heating than the central portion 222, but which has received enough heating to melt the material, and particularly in a portion 224 in which the texturing process ends with the lower temperature represented by the lower temperature portion 216 of curve 210 (shown in FIG. 8A). The temperature profile at the end of the laser exposure process controls the final shape of the textured spot, because melted material can still flow at this time. The profile of FIG. 8C is undesirable for use in a CSS region because of it does not present a smooth and well regulated profile to a magnetic head across which the disk surface is dragged in the process of starting or stopping disk rotation.

Thus, without the present invention, one of the limitations on the speed at which the texturing process can occur has been a lack of uniformity caused by rotating too far during the production of a small textured spot. With lateral movement of the laser beam, in the direction of movement of the disk relative to the laser beam, during the beginning and end of the process of texturing a single spot, significantly faster rotational speeds of the can be used in the texturing process without experiencing problems of this type. That is, movement of the laser as required in the present invention causes the conditions of FIGS. 7A–7C to occur, even at rotational speeds which would otherwise cause the conditions of FIGS. 8A–8C to occur.

FIG. 9 is a plan view of an alternative form of laser beam modulation, which can also produce the lateral beam movement in a first direction at the beginning and end of each texturing pulse. In the example, a continuous laser 230 is modulated by reflection off a multi-faceted mirror wheel 232, which is rotated in the direction of arrow 234. When the reflected beam 236 aligns with a first hole 238 in an aperture plate 240, the reflected beam extends along a first deflected beam path toward a first texturing point. With additional rotation of the wheel 232, the reflected beam 238 aligns with a second hole 242 in the plate 240, so that the reflected beam extends along a second deflected beam path toward a second texturing point.

While the invention has been described in its preferred forms or embodiments with some degree of particularity, it is understood that this description has been given only by way of example and that numerous changes in the details of construction, fabrication, and use, including changes in the combination and arrangement of parts, may be made without departing from the spirit and scope of the invention.

What is claimed is:

1. Apparatus for forming textured spots in a surface moving in a first direction, wherein said apparatus comprises:
    a laser producing a continuous laser beam;
    a modulator deflecting said continuous laser beam into a deflected beam path, wherein said laser beam is deflected by said modulator into said deflected beam path with lateral movement in a second direction, wherein said laser beam is moved out of said deflected beam path by said modulator with lateral movement in said second direction, wherein said modulator includes a multi-faceted rotating mirror wheel, and an aperture plate including a hole through which a reflection of said continuous laser beam is driven by rotation of said mirror wheel, wherein said lateral movement in said second direction is caused by movement of said laser beam into and out of said hole; and
    optical projection means extending between said modulator and a stationary point at said surface moving in a first direction, wherein said optical projection means projects said laser beam on said surface moving in a first direction so that said lateral movement in a second direction is projected as lateral movement in said first direction.

2. Apparatus for texturing first and second opposing sides of a disk rotating about a central axis, wherein said apparatus comprises:

a laser producing a continuous laser beam;

first and second optical projection paths; and a modulator sequentially deflecting said continuous laser beam to travel along said first optical projection path to texture said first side of said disk and to travel along said second optical projection path to texture said second side of said disk, wherein said continuous laser beam is deflected into and out of said first optical projection path by said modulator with lateral movement in a first direction, wherein said continuous laser beam is deflected into and out of said second optical projection path by said modulator with lateral movement in a second direction, wherein said first optical projection path projects said laser beam on said first side of said disk at a first stationary texturing spot with said lateral movement in said first direction being projected as movement in the direction of movement of said disk at said first stationary texturing spot, and wherein said second optical projection path projects said laser beam on said second side of said disk at a second stationary texturing spot with said lateral movement in said second direction being projected as movement in the direction of movement of said disk at said second stationary texturing spot.

3. The apparatus of claim 2, wherein each said optical projection path includes a dove prism causing rotation of a lateral direction of motion of said laser beam.

4. The apparatus of claim 2, wherein said modulator is an acoustical-optical modulator having a first transducer operating in response to a first control pulse to generate a first acoustical field within said acoustical modulator and a second transducer operating in response to a second control pulse to generate a second acoustical field within said acoustical modulator, said first acoustical field causes said continuous laser beam to be deflected to travel along said first optical projection path, said second acoustical field causes said continuous laser beam to be deflected to travel along said second optical projection path, said lateral movement in a first direction is caused by movement of said first acoustic field across said continuous laser beam within said modulator at a beginning and end of said first control pulse, and said lateral movement in a second direction is caused by movement of said second acoustic field across said continuous laser beam within said modulator at a beginning and end of said second control pulse.

5. The apparatus of claim 4, wherein, in response to an absence of both said first and second acoustical fields, said continuous laser beam is transmitted through said modulator in a third optical projection path.

6. The apparatus of claim 5, wherein laser beam power is measured in said first, second, and third optical projection paths.

7. The apparatus of claim 4, wherein said first and second optical projection paths extend symetrically on each side of said first optical projection path.

8. The apparatus of claim 2, wherein said modulator includes:

a multi-faceted rotating mirror wheel;

an aperture plate including a first hole through which said continuous laser beam is driven into said first optical projection path by rotation of said mirror wheel and a second hole through which said continuous laser beam is driven into said second optical projection path, wherein said lateral movement in said first and second directions is caused by movement of said continuous laser beam into and out of said first and second holes.

* * * * *